United States Patent
Makhalov et al.

(10) Patent No.: US 12,079,073 B2
(45) Date of Patent: Sep. 3, 2024

(54) VERIFYING OBJECT FILE CANISTERS USING BUILT-IN REVERSE RELOCATION INTEGRITY CHECKING

(71) Applicant: VMware LLC, Palo Alto, CA (US)

(72) Inventors: Alexey Makhalov, Bellevue, WA (US); Bo Gan, Bellevue, WA (US)

(73) Assignee: VMware LLC, Palo Alto, CA (US)

( * ) Notice: Subject to any disclaimer, the term of this patent is extended or adjusted under 35 U.S.C. 154(b) by 561 days.

(21) Appl. No.: 17/214,221

(22) Filed: Mar. 26, 2021

(65) Prior Publication Data
US 2022/0308956 A1    Sep. 29, 2022

(51) Int. Cl.
| | | |
|---|---|---|
| G06F 11/10 | (2006.01) | |
| G06F 8/54 | (2018.01) | |
| G06F 9/4401 | (2018.01) | |
| G06F 9/445 | (2018.01) | |
| G06F 21/00 | (2013.01) | |
| H04L 9/14 | (2006.01) | |

(52) U.S. Cl.
CPC ............ *G06F 11/1004* (2013.01); *G06F 8/54* (2013.01); *G06F 9/4403* (2013.01); *G06F 9/445* (2013.01); *H04L 9/14* (2013.01)

(58) Field of Classification Search
CPC . G06F 8/54; G06F 9/445; G06F 21/50; G06F 21/51; G06F 21/57; G06F 21/575; G06F 21/577; G06F 21/54
See application file for complete search history.

(56) References Cited

U.S. PATENT DOCUMENTS

| | | | |
|---|---|---|---|
| 2004/0237072 A1 | 11/2004 | Gelissen | |
| 2008/0028124 A1* | 1/2008 | Tago | G06F 9/45558 |
| | | | 711/6 |

(Continued)

FOREIGN PATENT DOCUMENTS

| | | |
|---|---|---|
| EP | 3259698 | 12/2017 |
| KR | 101064164 | 9/2011 |

OTHER PUBLICATIONS

Edge, J., "Kernel address space layout randomization" https://lwn.net/Articles/569635, posted Oct. 9, 2013, 5 pages.

(Continued)

*Primary Examiner* — Edward Zee
(74) *Attorney, Agent, or Firm* — King Intellectual Asset Management

(57) ABSTRACT

The disclosure herein describes integrity verification of a checksum of a canister data structure using built-in checksum verification capability. A kernel image is accessed, and a canister data structure is allocated in a section of memory. The canister data structure is loaded with canister data from the kernel image, wherein the loading is based on an interpreter obtained from the kernel image, wherein the canister data includes address relocation data and a checksum of the canister data. A binary image of the canister data structure is assembled, wherein the assembling includes at least performing reverse relocation on the canister data structure using the address relocation data. A checksum is generated based on the assembled binary image, and the checksum of the canister data is verified using the generated checksum. The integrity of the canister data structure is confirmed based on the verification.

20 Claims, 7 Drawing Sheets

(56) References Cited

U.S. PATENT DOCUMENTS

| | | | |
|---|---|---|---|
| 2011/0078791 A1* | 3/2011 | Prakash | G06F 21/567 |
| | | | 726/22 |
| 2011/0258516 A1* | 10/2011 | Salmon-Legagneur | ................... |
| | | | G06F 21/14 |
| | | | 714/768 |
| 2014/0245271 A1* | 8/2014 | Miller | G06F 8/423 |
| | | | 717/146 |

OTHER PUBLICATIONS

Koo, Hyungjoon, et al. Compiler-assisted code randomization. 2018 IEEE Symposium on Security and Privacy (SP). IEEE, 2018.

* cited by examiner

VERIFYING OBJECT FILE CANISTERS USING BUILT-IN REVERSE RELOCATION INTEGRITY CHECKING

BACKGROUND

Verification of the integrity of software in a computing system at boot time and/or at run time is a vital process for ensuring the computing system is secure and stable. This is especially true for software that makes up the core processes of a computing system, such as software in a LINUX kernel. In many cases, verification of such software includes generating a checksum based on the current state of the software, or otherwise measuring the current state of the software, and comparing that result to a previous result that was generated from the software when it was known to be in a state in which the integrity of the software was confirmed.

In some cases, software is further certified through associated processes to secure the use of the software more strictly. For instance, encryption software may be certified further. However, when such certified software is included in a larger set of software and checksum verification is required to make use of the larger set of software, it may be required for the certification process to be redone for the larger set of software for every change made to any portion of the larger set of software, even if the encryption software has itself not been changed. Such repeated recertification processes result in significant costs in time and resources used by the associated computing system.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the disclosure enhance the use of canister data structures at least by accessing, by a processor, a kernel image including canister data; allocating, by the processor, a canister data structure in a section of memory; loading, by the processor, the canister data structure with the canister data from the kernel image, wherein the loading is based on an interpreter obtained from the kernel image, wherein the canister data includes address relocation data and a checksum of the canister data; assembling, by the processor, a binary image of the canister data structure, wherein the assembling includes at least performing reverse relocation on the canister data structure using the address relocation data; generating, by the processor, a checksum based on the assembled binary image of the canister data structure; and verifying, by the processor, the checksum of the canister data from the kernel image using the generated checksum, wherein integrity of the canister data structure is confirmed based on the verifying.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 7, the systems are illustrated as schematic drawings. The drawings may not be to scale.

DETAILED DESCRIPTION

Figure 1:
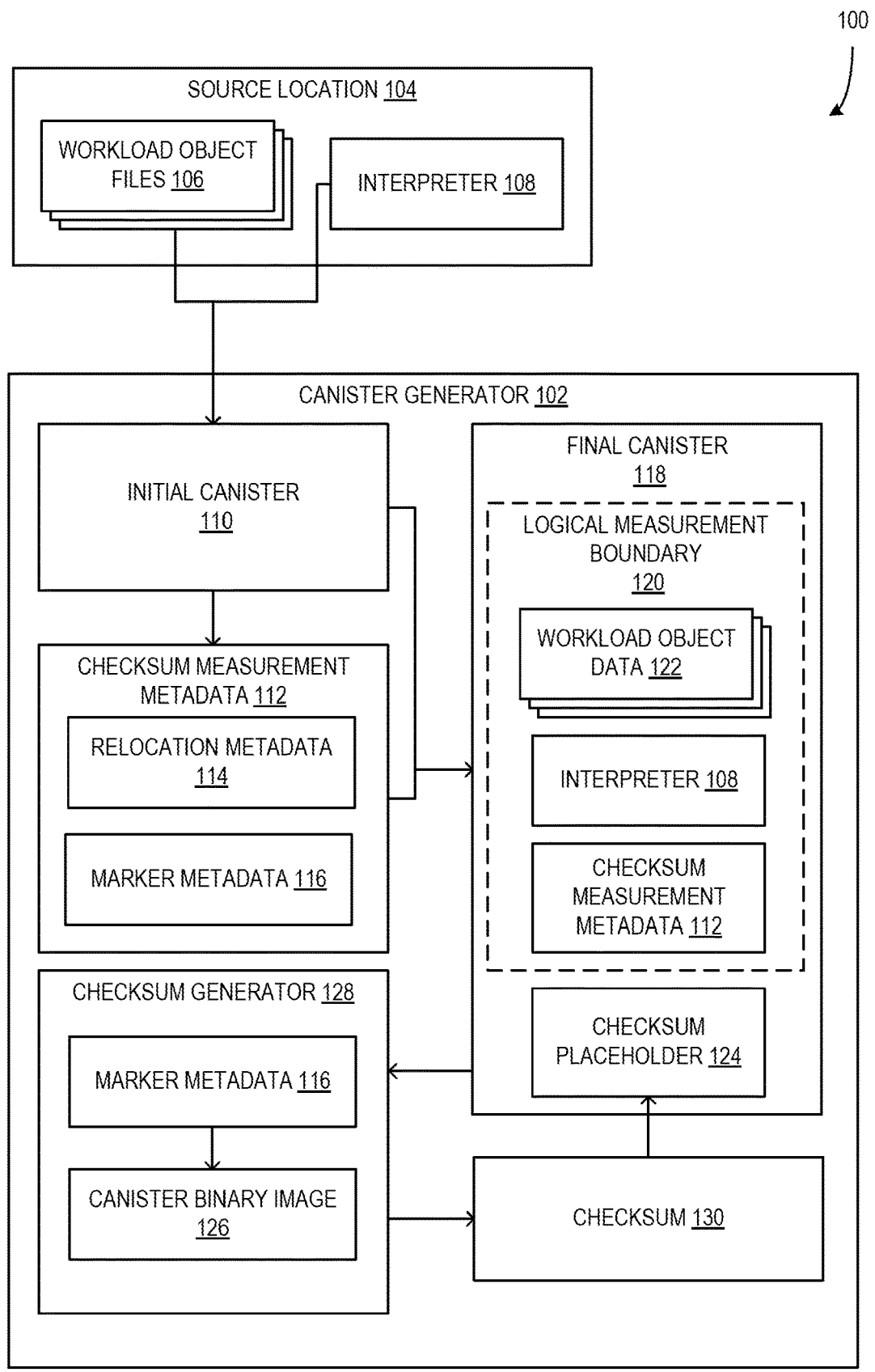
FIG. 1 is a block diagram illustrating a system including a canister generator configured to generate a canister data structure that includes built-in checksum verification capability according to an embodiment.

Systems for generating canister data structures with built-in checksum verification capabilities and for confirming the integrity of such canister data structures using the built-in checksum verification capabilities are described. The canister data structures enable focused integrity confirmation of the software in the canister data structures at boot time, at run time, or at other times, even when the canister data structure and associated software is integrated into a larger set of software, such as a kernel image. The configuration of such a canister data structure further enables the reuse of the canister data structure in multiple different sets of software and/or on multiple different computing devices while reducing time and resources spent on checksum verification processes and/or certification processes associated with those sets of software. For instance, a canister data structure configured to include Federal Information Processing Standards (FIPS) certified encryption software may be incorporated in different kernel images and/or on different computing devices without requiring that each kernel image be recertified after each change made to the kernel image, with the disclosure. While a certified version of such a FIPS-based canister data structure is maintained within a kernel image, other software within the kernel image may be updated or otherwise changed without recertification processes having to be performed on the overall kernel image.

The described method and system enable the generation of a canister data structure with built-in checksum verification. In some examples, the canister data structure is generated in a section of memory, wherein the canister data structure includes a checksum placeholder location. Workload object data is loaded into the canister data structure. Checksum measurement metadata is generated from the canister data structure, including address relocation metadata and marker metadata. The canister data structure is loaded with the generated checksum measurement metadata and an interpreter. A binary image of the canister data structure is assembled, and a checksum of the binary image is generated. The generated checksum is loaded into the checksum placeholder location.

Further, the described method and system enable the verification of a checksum of a container data structure based on built-in checksum verification capabilities. In some examples, a kernel image is accessed, and a canister data structure is allocated in a section of memory. The canister data structure is loaded with canister data from the kernel image, wherein the loading is based on an interpreter obtained from the kernel image. The canister data includes address relocation data and a checksum of the canister data. A binary image of the canister data structure is assembled, wherein the assembling includes at least performing reverse relocation on the canister data structure using the address relocation data. A checksum is generated based on the assembled binary image, and the checksum of the canister data is verified using the generated checksum. The integrity of the canister data structure is confirmed based on the verification.

The disclosure addresses the challenges, among others, of enabling sets of software to be incorporated into kernel images or the like while reducing the use of time and processing resources to verify integrity and/or certification of those kernel images and/or sets of software. By packaging the set of software in the described canister data structure, the disclosure operates in an unconventional manner by also including metadata, an interpreter, and a checksum in the canister data structure. The metadata and interpreter enable a corresponding checksum to later be generated by any system in which the canister data structure is located, regardless of the container being incorporated into a kernel image or the like, at least due to the described reverse relocation process. Systems that make use of the described canister data structures may avoid repeated recertification and/or reverification of the software within the canister (or the canister itself) based on changes to the set of software in which the canister is included. Further, when verification is performed, it is performed in a consistent and more granular way to specifically verify the integrity of the software within the container data structure. This also enables systems using the containers to define processes for responding to results of container integrity verification that are device-specific and/or system-specific, enhancing flexibility of the process. Many different systems may make use of the same version of software of a described container data structure and use the built-in verification capabilities, despite significant differences in configuration, settings, and/or sets of software in those different systems. Additionally, because the tools and data needed to perform the integrity verification process are built into the container data structure, communication with a server during the verification of the container data structure is avoided, potentially reducing bandwidth usage.

In some examples, the disclosure allows certification of only a portion of the kernel (e.g., a FIPS cryptography algorithm). This portion is compiled in a canister object, certified (e.g., according to FIPS standards), and reused for all newer kernel builds. In particular, aspects of the disclosure measure the canister binary and reproduce this measurement at runtime to perform an integrity check, thereby enabling the building of a canister image once that can be reused for any following builds of the kernel. It should be understood that, in some examples, certification of software in a canister object includes processes for confirming that the software complies with a defined standard or standards (e.g., the software is certified according to a standard). Once a version of the canister software is certified, the described checksum verification may be used to verify the version of the software in the canister in order to verify that it is the certified version.

FIG. 1 is a block diagram illustrating a system 100 including a canister generator 102 configured to generate a canister data structure 118 that includes built-in checksum verification capability according to an embodiment. The described canister data structures (e.g., final canister 118) include sets of object files (e.g., workload object files 106) that are linked (e.g., via a linker script) and/or merged into a single relocatable object that can then be linked into an executable file. Such canisters enable the set of object files to be efficiently relocated (e.g., installed on other systems in a specific way) in a group. In some examples, the set of object files in a canister may be related or associated with each other in one or more ways such that it is desirable for the object files to be grouped together, such as object files that are dependent on each other or that are configured to perform related operations. In examples described herein, the set of object files includes cryptographic algorithm files that are grouped together in a canister configured for enabling systems to make use of Federal Information Processing Standards (FIPS) encryption standards, but it should be understood that, in other examples, the described canister generation process and canister checksum verification process may be used with other types of object files without departing from the description herein.

In some examples, the canister generator 102 includes hardware, firmware, and/or software configured to obtain or otherwise access data at the source location 104 and use the accessed data to generate and/or configure a final canister 118 which can then be used on other systems, devices, or the like, including verification of the final canister 118 based on the built-in data and checksum. The canister generator 102 may be stored and/or executed on a computing device and the source location 104 where the workload object files 106 and interpreter 108 are stored may also be on the same device. Alternatively, the canister generator 102 may be located and executed on a first device in communication (e.g., via a network) with a second device upon which the source location 104 is located. In still other examples, the canister generator 102 and/or the source location 104 may be distributed across multiple computing devices organized in one or more communication networks (e.g., a cloud computing network). The canister generator 102 and/or source location 104 may also include other computing device configurations or arrangements without departing from the description herein.

In some examples, the canister generator 102 obtains or receives the workload object files 106 and the interpreter 108 from the source location 104 and places them, or links them, in an initial canister 110 data structure. The initial canister 110 data structure is then used to determine, calculate, or otherwise generate checksum measurement metadata 112, including relocation metadata 114 and marker metadata 116, which may be used during a canister verification process to perform a "reverse relocation" process on the data of the canister as described herein. The workload object files 106 are the object files that are configured to ultimately perform the operations for which the final canister 118 is configured. In some examples, the workload object files 106 are object files that are configured to enable the performance of one or more encryption algorithms on other data according to established standards (e.g., FIPS encryption standards). The interpreter 108 is an object that is configured to perform a runtime measurement of the canister (e.g., generate a checksum from the canister) by interpreting data in the final canister 118, such as checksum measurement metadata 112, even if the entire canister has been relocated to a different memory location and/or an entirely different computing device. In some examples, the interpreter 108 is a FIPS integrity verification object.

Additionally, or alternatively, the workload object files 106 and interpreter 108 may be obtained from the source location 104 as object files that had previously been compiled from workload source code and interpreter source code, respectively. In other examples, the canister generator 102 is configured to obtain workload source code and/or interpreter source code from the source location 104 and to compile the workload source code into the workload object files 106 and to compile the interpreter source code into the interpreter 108.

In some examples, the checksum measurement metadata 112 includes relocation metadata 114 and marker metadata 116. The relocation metadata 114 may include addresses, offsets, symbol names, and/or other references that can be used during a relocation process of the final canister 118 to ensure that the various references between workload object files 106 are intact and functional after the relocation. Further, the references of the relocation metadata 114 may be used to apply a reverse relocation process to a relocated version of the final canister 118 to convert it back to the configuration of the canister from when the relocation metadata 114 was first generated. Additionally, the marker metadata 116 are metadata values that may be generated when the initial canister 110 is created and the workload object files 106 and interpreter 108 are included therein. The markers of the marker metadata 116 define the locations within the canister at which sections of the canister memory begin and end (e.g., begin and end points of execution code sections (.text), global read/write data sections (.data), global read-only data sections (.rodata), boot-time only execution code sections (.init.text)). In some examples, each workload object file 106 has a set of sections and, during a linking process, identical or matching sections of multiple workload object files 106 are combined into sections of a canister (e.g., all .text sections from input workload object files are concatenated otherwise merged into a single .text section of the canister). In such examples, canister metadata contains as many marker pairs as there are loadable sections in the canister (minus one loadable section which contains the checksum). The marker metadata 116 may be used to locate each section of the canister in the canister binary image 126 and use that location data during the generation of the checksum 130 and/or other related measurement operations. The checksum measurement metadata 112 may further include other data, such as canister information tables and/or data structures with information indicating what data to measure and how to measure the canister binary image 126 during the measurement process.

As illustrated, the initial canister 110 is combined with the generated checksum measurement metadata 112 to form the final canister 118 data structure. The final canister 118 includes the workload object data 122 associated with the workload object files 106 (in some cases, data of workload object files 106 may be rearranged into workload object data 122 based on how the canister data structure is configured), the interpreter 108, and the checksum measurement metadata 112 in a logical measurement boundary 120. The logical measurement boundary 120 is a boundary defined to contain the data that is used during generation of a checksum and/or other measurement operations applied to the canister. The final canister 118 further includes a checksum placeholder 124, a data location within the canister 118 in which the checksum 130 is placed when it is generated as described herein. The checksum placeholder 124 is located outside of the logical measurement boundary 120, which describes a logical boundary around the data of the canister that is measured by the interpreter 108 during checksum generation and verification processes.

Upon generation of the final canister 118, the final canister 118 is then used to assemble a canister binary image 126. In some examples, the canister binary image 126 is generated by a checksum generator 128, at least in part, based on the marker metadata 116 of the checksum measurement metadata 112 in the logical measurement boundary 120, such that the obtained image 126 can be recreated by other entities that have access to the final canister 118 with the checksum measurement metadata 112. The checksum generator 128 is used to generate a checksum 130 from the canister binary image 126, using the marker metadata 116. Additionally, or alternatively, in other examples, more or different types of data and/or metadata of the canister binary image 126 may be used to generate the checksum 130 without departing from the description herein. The generated checksum 130 is then placed in the checksum placeholder 124 of the final canister 118, completing the final canister 118 such that it is now suitable for relocation and verification in a new location using the built-in verification data (e.g., the interpreter 108, the checksum measurement metadata 112, and the checksum 130). In some examples, the generated checksum 130 is based only on the data within the logical measurement boundary 120 (e.g., the marker metadata 116 stored therein) and none of the data of the canister 118 outside of the logical measurement boundary 120 is used to generate the checksum 130. For instance, the checksum placeholder 124 is outside the logical measurement boundary 120 because the checksum 130 that is placed therein is itself dependent on performing the checksum generation process on the rest of the canister binary image 126. Otherwise, generating the checksum 130 based on the checksum placeholder 124 location and then placing the checksum 130 in that location for later verification processes would render those verification processes ineffective due to the change of adding the checksum 130 into the placeholder 124 location.

In some examples, the checksum 130 is generated based on a hash-based message authentication code (HMAC) algorithm, such as a HMAC algorithm using a secure hash algorithm 256 (SHA-256). In other examples, other algorithms and/or methods may be used to generate the checksum 130 based on the contents of the logical measurement boundary 120 of the binary image 126 of the final canister 118. Additionally, or alternatively, other processes may be performed on the canister binary image 126 by the checksum generator 128 in order to obtain a measurement of the canister 118 for later verification.

In some examples, the final canister 118 is uploaded or otherwise stored on a server that is configured to enable other devices to download the final canister 118 and include it in kernel images or other software sets. The final canister 118 may be uploaded to such a server over a network connection. Alternatively, or additionally, the canister generator 102 may be configured to operate as such a server, and to provide access to the final canister 118 to other computing devices over network connections.

Figure 2:
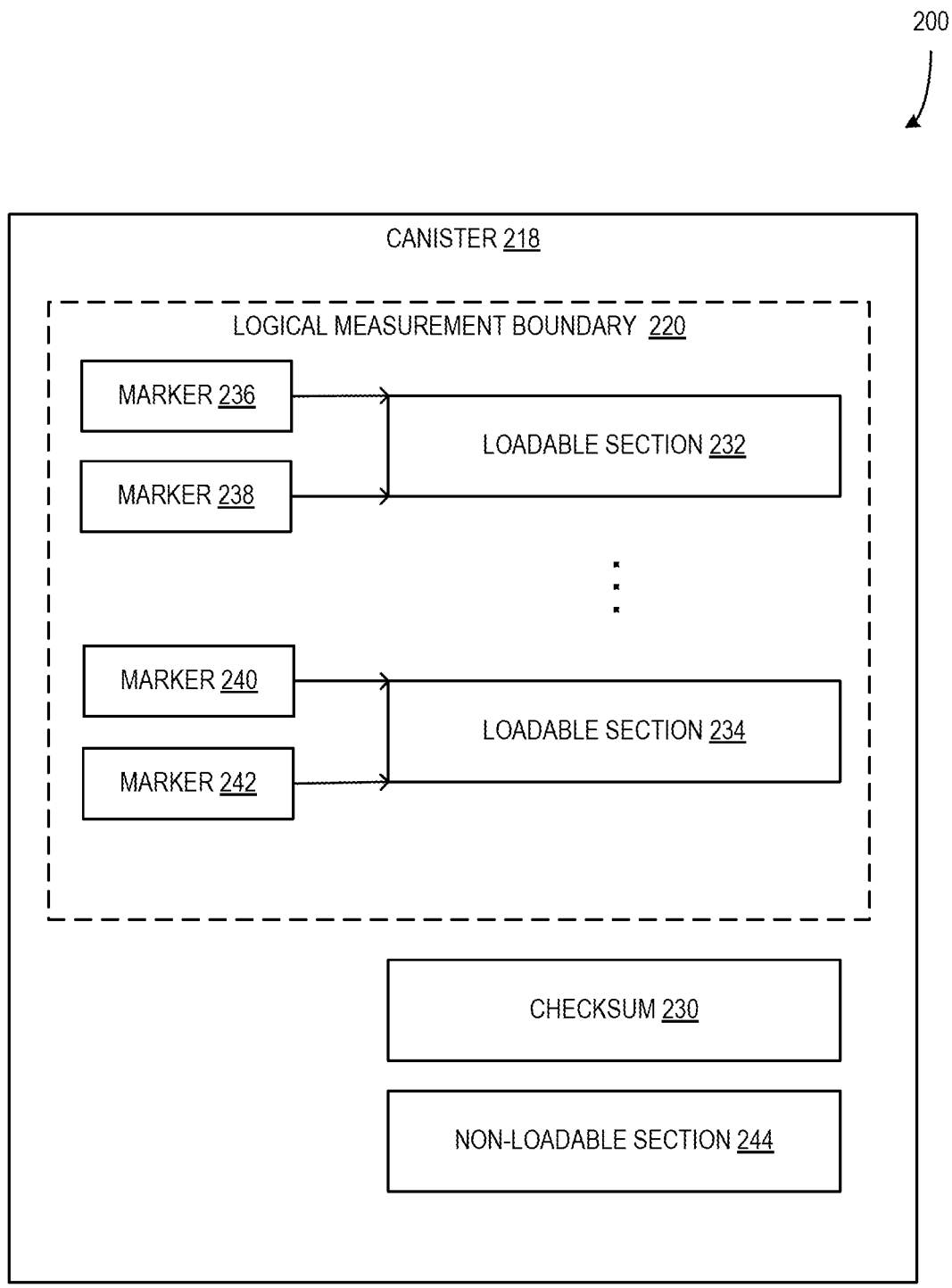
FIG. 2 is a block diagram illustrating a canister data structure including loadable sections with marker metadata according to an embodiment.

FIG. 2 is a block diagram 200 illustrating a canister data structure 218 including loadable sections 232-234 with marker metadata 236-242 according to an embodiment. In some examples, the canister 218 is a canister data structure generated by a canister generator such as the canister generator 102 of FIG. 1 as described herein. The canister 218 includes a logical measurement boundary 220 that defines the sections (e.g., the loadable sections 232 and 234) that are used for performing measurement operations, such as generating checksums. The canister 218 further includes loadable sections 232-234, which may include code, read-only data, or other data that is present in a final executable binary image generated from the canister 218. The canister 218 also includes a non-loadable section 244, which may include other data, such as debug information, section relocations, and/or symbol tables, which are not present in the final executable binary image. The checksum 230 is further included in the canister 218 but outside the logical measurement boundary 220 since it is not used during the described measurement process. Marker metadata (e.g., marker metadata 116) of the canister 218 includes markers 236, 238, 240, and 242. In some examples, the markers 236-242 include symbol data associated with locations within the canister 218. The markers 236-242 may be used to determine logical measurement boundaries of the canister during checksum creation and/or verification, and in memory, at runtime, for integrity checking (in such cases, actual address locations pointed to by the markers are resolved using a lookup table). Markers 236 and 238 indicate the start location and end location of the loadable section 232, respectively. Markers 240 and 242 indicate the start location and end location of the loadable section 234, respectively. The markers 236-242 are also stored within the canister 218 (e.g., in the checksum measurement metadata 112) in the logical measurement boundary 220, such that the markers themselves are used during the measurement process. In some examples, while the checksum 230 is illustrated as being separate from the loadable sections 234, the checksum 230 may be part of or adjacent to one or more of the loadable sections 232-234. In such cases, the logical measurement boundary 220 is defined in such a way as to exclude the location of the checksum 230. Further, while there are only two loadable sections 232-234 and one non-loadable section 244 illustrated, in other examples, more, fewer, or different arrangements of loadable sections and non-loadable sections may be used in a canister without departing from the description.

Figure 3:
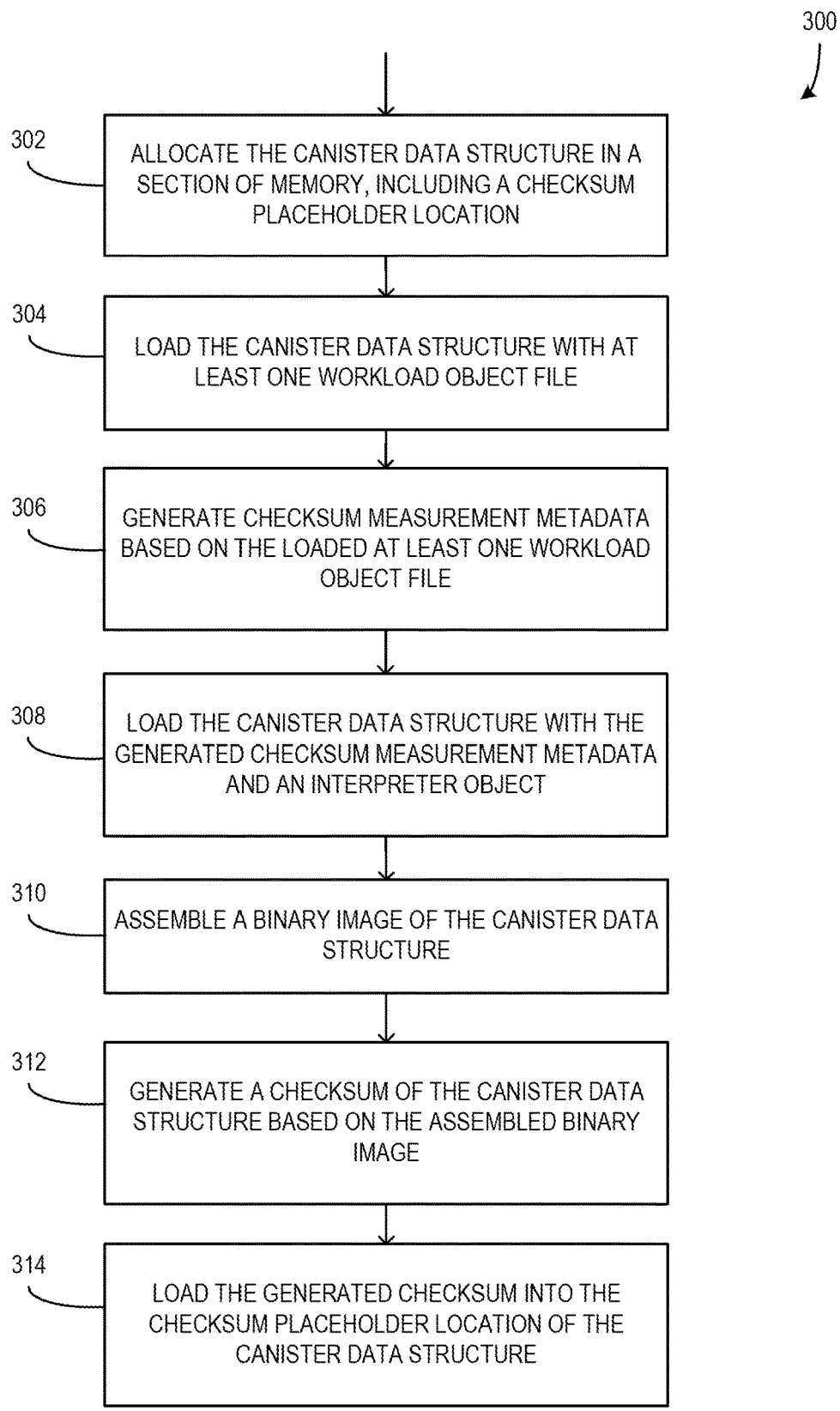
FIG. 3 is a flowchart illustrating a process of generating a canister data structure including built-in checksum verification capability according to an embodiment.

FIG. 3 is a flowchart illustrating a process 300 of generating a canister data structure (e.g., canister 118) including built-in checksum verification capability according to an embodiment. In some examples, the process 300 is performed or otherwise executed on a system such as system 100 and/or by a canister generating entity such as canister generator 102 of FIG. 1. At 302, a canister data structure is allowed in a section of memory. The allocated canister data structure includes a checksum placeholder location. Further, in some examples, the canister data structure includes a logical measurement boundary (e.g., logical measurement boundary 120) that excludes the checksum placeholder location and includes data locations that may be filled by other data, such as workload object data 122, an interpreter 108, and/or checksum measurement metadata 112.

The process 300 may be initiated as part of a process configured to prepare a set of workload object files of the canister for sharing with others, or otherwise for relocation to other computing devices and/or systems. Thus, the process 300 may be initiated after, for instance, compiling of source code to generate the workload object files to be placed in the canister. Additionally, or alternatively, other processes configured for preparing the workload object files for use may precede process 300 and/or cause process 300 to be initiated without departing from the description.

At 304, the canister data structure is loaded with at least one workload object file (e.g., workload object files 106). In some examples, the canister data structure is loaded with a plurality of workload object files that are configured to perform similar functions, are dependent on each other, or are otherwise associated with each other. For instance, for a canister associated with FIPS encryption standards, the canister data structure may be loaded with a plurality of workload object files that are configured to perform different types of encryption that are all approved under the FIPS standard. In some examples, loading the workload object files onto the canister data structure may include sorting or otherwise rearranging the files into workload object data (e.g., workload object data 122) and the location of the data in the canister data structure may be tracked for use as checksum measurement metadata (e.g., checksum measurement metadata 112).

At 306, the checksum measurement metadata is generated based on the loaded workload object file. In some examples, the checksum measurement metadata includes relocation metadata (e.g., relocation metadata 114) and/or marker metadata (e.g., marker metadata 116). The checksum measurement metadata is then loaded into the canister data structure at 308, along with an associated interpreter object (e.g., interpreter 108). The checksum measurement metadata and the interpreter may be loaded into the canister data structure in locations that are included in a logical measurement boundary. Alternatively, a logical measurement boundary may be defined within the canister data structure after the checksum measurement metadata and the interpreter are loaded into the canister data structure.

At 310, a binary image of the canister data structure is assembled based on the canister data structure and on canister data structure metadata, such as the checksum measurement metadata (e.g., marker metadata 116). At 312, a checksum (e.g., checksum 130) of the canister data structure is then generated based on the assembled binary image and the checksum measurement metadata. In some examples, the checksum is generated using an HMAC algorithm such as an HMAC algorithm using SHA-256.

The generated checksum is then loaded into the canister data structure in the checksum placeholder location at 314. In some examples, because the checksum placeholder location is outside of or otherwise excluded from the logical measurement boundary of the canister data structure, the loaded checksum is located outside of the logical measurement boundary.

In some examples, the described systems perform and/or the described methods include a method for generating a canister data structure with built-in checksum verification comprising: generating, by a processor, the canister data structure in a section of memory, the canister data structure including a checksum placeholder location; loading, by the processor, of the canister data structure with at least one workload object file or workload object data; generating, by the processor, checksum measurement metadata based at least on the loaded at least one workload object file, wherein the checksum measurement metadata includes address relocation data associated with the loaded at least one workload object file; loading, by the processor, the canister data structure with the generated checksum measurement metadata and an interpreter; assembling, by the processor, a binary image of the canister data structure; generating, by the processor, a checksum of the canister data structure based on the assembled binary image, wherein the checksum is generated by performing a checksum measurement of the assembled binary image using the interpreter; and loading, by the processor, the generated checksum into the checksum placeholder location of the canister data structure.

Further, in some examples, the described systems perform and/or the described methods include a method for providing an object file canister data structure with built-in checksum verification comprising: generating, by a processor, the canister data structure in a section of memory, the canister data structure including a checksum placeholder location and a logical checksum measurement boundary separate from the checksum placeholder location; loading, by the processor, the logical checksum measurement boundary of the canister data structure with at least one workload object file; generating, by the processor, checksum measurement metadata based at least on the loaded at least one workload object file, wherein the checksum measurement metadata includes address relocation data associated with the loaded at least one workload object file; loading, by the processor, the logical checksum measurement boundary of the canister data structure with the generated checksum measurement metadata; loading, by the processor, the logical checksum measurement boundary of the canister data structure with an interpreter, wherein the interpreter is configured to use the generated checksum measurement metadata to perform run-time checksum measurement of the canister data structure; assembling, by the processor, a binary image of the canister data structure based on the logical checksum measurement boundary of the canister data structure; generating, by the processor, a checksum of the canister data structure based on the assembled binary image, wherein the checksum is generated by performing a checksum measurement of the assembled binary image using the interpreter; loading, by the processor, the generated checksum into the checksum placeholder location of the canister data structure; and providing, by the processor, the canister data structure for use, whereby entities using the canister data structure are configured to verify integrity of the checksum using the interpreter, the checksum measurement metadata, and the loaded checksum of the canister data structure.

Figure 4:
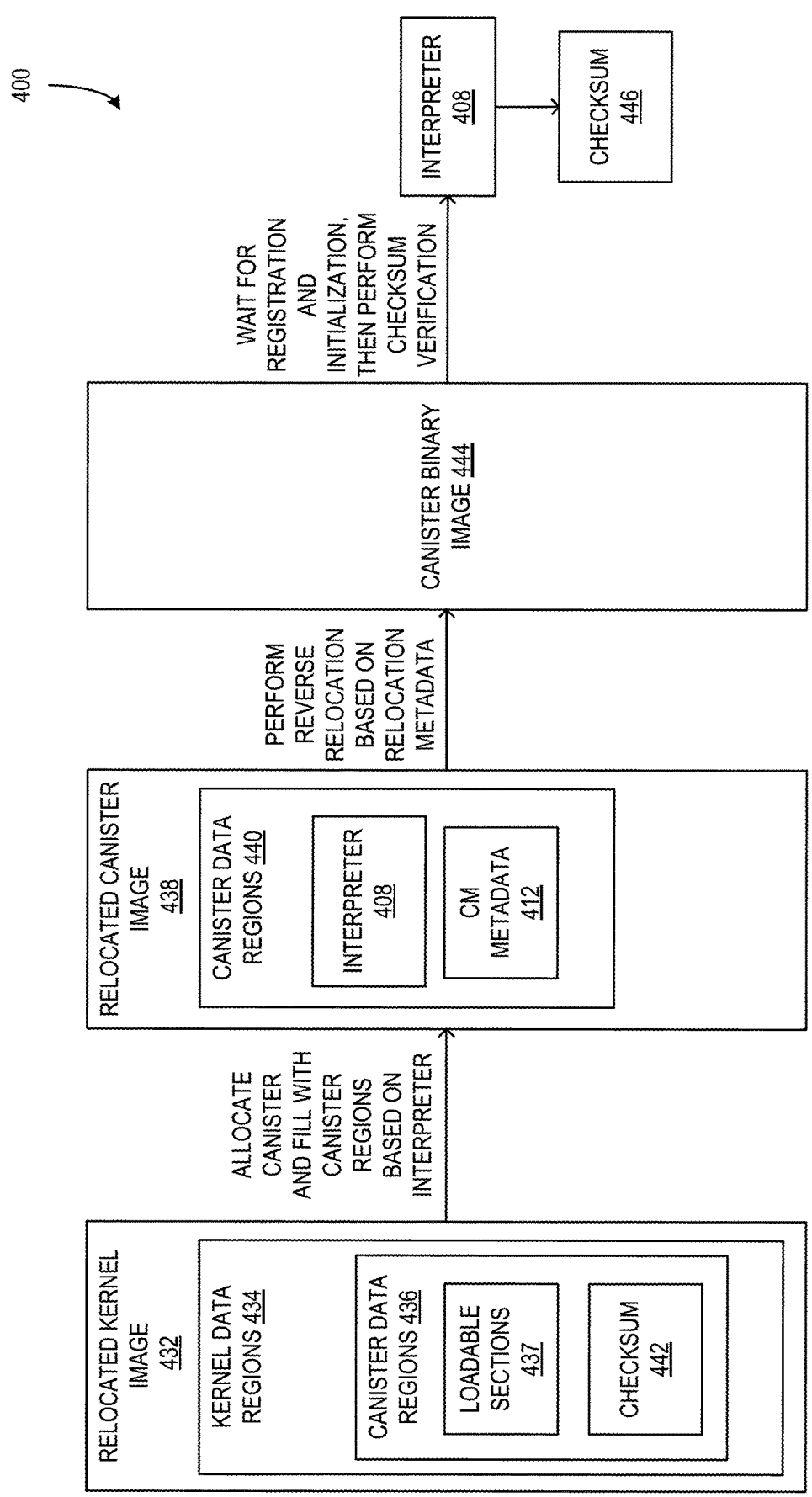
FIG. 4 is a block diagram illustrating a system configured to verify a canister using built-in checksum verification capability of the canister according to an embodiment.

FIG. 4 is a block diagram illustrating a system 400 configured to verify a canister (e.g., relocated canister image 418) using built-in checksum verification capability of the canister according to an embodiment. In some examples, the system 400 includes data, components, and/or software stored on and/or executed on one or more computing devices. For instance, the relocated kernel image 432 may be initially located on a computing device and the verification of the canister data regions 436 may be performed on that computing device. In some examples, the canister data regions 436 include all data locations within the relocated kernel image 432 in which data associated with the described canister are stored. Alternatively, the verification of the canister data regions 436 may be performed on a different computing device or devices without departing from the description. Additionally, in some examples, the verification of the canister as described is performed during boot time of the computing device and/or during runtime of the computing device.

The relocated kernel image 432 (e.g., a LINUX kernel image) includes kernel data regions 434, which in turn include the canister data regions 436 (e.g., the canister data regions 436 are associated with a canister data structure that has previously been generated as described herein with respect to FIGS. 1-3). In some examples, the relocated kernel image 432 and associated data regions 434 and 436 have been relocated to locations on the computing device from different locations on the computing device or from different computing devices. For instance, the data regions may be relocated to random memory addresses that are different from initial load addresses according to a kernel address space layout randomization (KASLR) process, which may make exploiting such a kernel layout more difficult. In some examples, such a KASLR process introduces runtime relocation of data regions of the kernel in addition to any build time relocation that occurs during final linking. The canister from which the canister data regions 436 are based is configured as a relocatable object, such that it can be statically linked into the kernel image 432 and/or other data structures such as executable binaries. Further, it should be understood that the canister verification process described herein may not be performed until after the relocated kernel image 432 is fully relocated to a run-time location within the computing device or system, but it should be performed prior to use of the workload code included in the canister data regions 436.

A canister data structure is allocated and at least some of the canister data regions 436 are used to fill the canister data structure to form the relocated canister image 438, which includes the canister data regions 440 (e.g., the loadable sections 437 of the canister, including workload data, interpreter 408, and metadata 412 as described herein). In some examples, an interpreter 408 of the canister (e.g., interpreter 108), which is included in the canister data during generation of the canister as described above, is used to perform, at least in part, the generation of the relocated canister image 438 (e.g., based on marker metadata included in the checksum measurement (CM) metadata 412 from the canister data regions 436). Additionally, the generation of the relocation canister image 438 and the associated canister data regions 440 may be performed based on other metadata stored in the CM metadata 412, as previously described.

In some examples, the recreation of the canister image 438 includes the interpreter 408 accessing canister information tables included in the metadata of the canister and determining a size of the canister. The interpreter 408 then allocates memory of that size to create the relocated canister image 438. The contents of the canister data regions 436, which may be arranged in a different order and/or non-consecutively in the kernel data regions 434, are copied by the interpreter 408, which may use marker metadata (e.g., marker metadata 116) and/or symbol lookup metadata to get start addresses and end addresses of each section of data. In some examples, symbol lookup table metadata is not be included in the checksum measurement boundary of the original canister and is, instead, included with the binary separately.

Based on the CM metadata 412 of the relocated canister image 438, including relocation metadata (e.g., relocation metadata 114), a reverse relocation process is performed by an interpreter (e.g., interpreter 408 from canister data regions 436) on the relocated canister image 438 to form a canister binary image 444. Reverse relocation may further be based on other data associated with the relocated kernel image (e.g., ksyms, a LINUX kernel symbol table or other symbols lookup table). The reverse relocation process is configured to reverse changes (e.g., link-time changes and/or run-time changes) made to the canister data when it was originally relocated from the location where it was generated to being located within the relocated kernel image 432. As a result of the reverse relocation process, the canister binary image 444 is configured to precisely reflect the state and/or configuration of a canister binary image (e.g., canister binary image 126) that was generated from the canister during its initial generation process.

After the hash algorithm or other algorithm configured for checksum generation is registered and initialized within the computing device and/or system, the interpreter 408 uses the initialized algorithm to generate a checksum 446 from the canister binary image 444. An indicator of the algorithm to use may be included within the configuration of the interpreter 408 and/or within the CM metadata 412 of the canister. In some examples, the interpreter 408 also makes use of the CM metadata 412 of the relocated canister image 438 to during generation of the checksum 446. It should be understood that the interpreter 408 is configured to perform checksum generation in the same manner as the generation of the checksum during the initial creation of the canister (e.g., the generation of the checksum 130 during creation of the final canister 118 in FIG. 1).

After generating the checksum 446, the interpreter 408 compares the generated checksum 446 to the checksum 442 that is included in the canister data regions 436 of the relocated kernel image 432. If the checksums 442 and 446 match, the system may be configured to take an action based on the canister being verified, such as proceeding with the configuration of and/or use of the workload objects of the canister during a runtime process. Alternatively, if the checksums 442 and 446 do not match, the verification of the canister has failed and an associated action may be taken, such as generating a notification of the failure of the verification and/or preventing the workload objects of the canister from being used during any runtime process. A failed verification may indicate that the data within the canister is compromised or that it has otherwise been altered and, thus, it should not be trusted. After the verification based on the checksum comparison, the memory occupied by the interpreter 408, the CM metadata 412, and the canister binary image 444 may be freed on the computing device or system.

It should be understood that, while the canister data regions 436 are included in a relocated kernel image 432, in other examples, canister data may be included in other types of images or sets of software without departing from the description.

Figure 5:
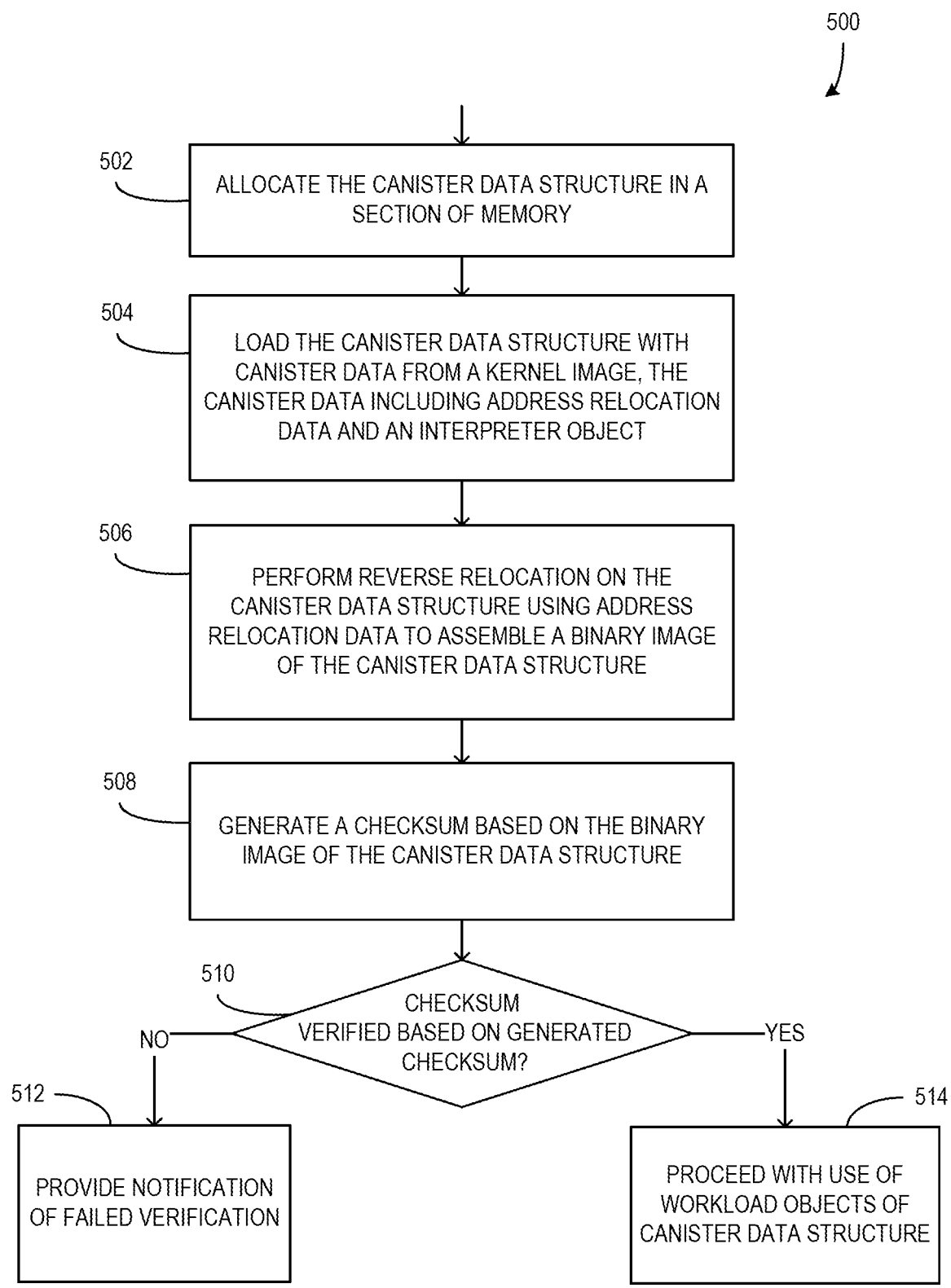
FIG. 5 is a flowchart illustrating a process of verifying a canister using built-in checksum verification capability of the canister according to an embodiment.

FIG. 5 is a flowchart illustrating a process 500 of verifying a canister (e.g., a canister 118 that has been relocated into canister data regions 436 in a relocated kernel image 432) using built-in checksum verification capability of the canister according to an embodiment. In some examples, the process 500 is executed or otherwise performed on a system such as system 400 of FIG. 4 and the process 500 is directed at a canister that has been generated by a system such as system 100 of FIG. 1. A kernel image is accessed and, at 502, a canister data structure is allocated in a section of memory. In some examples, the allocation of the canister data structure includes accessing an interpreter and canister metadata in the canister data regions of the relocated kernel image and using the interpreter and/or canister metadata to identify locations of canister data within the relocated kernel image. Further, in identifying the locations of the canister data, the interpreter may determine a memory size of the canister and use that determined memory size to allocate the canister data structure of sufficient size to contain the canister data.

At 504, the canister data structure is loaded with the canister data from the kernel image. As described, the canister data includes the address relocation data (e.g., as part of canister metadata such as relocation metadata 114 of checksum measurement metadata 112) and the interpreter object (e.g., interpreter 108, 408). The interpreter and metadata of the canister data are used to load the canister data into the canister data structure in a defined arrangement. For instance, in cases where the organization of canister data regions in the kernel image results in non-consecutive arrangement of canister data, the loading of canister data into the canister data structure may include reorganizing the canister data to be arranged consecutively based on the metadata (e.g., marker metadata 116) of the canister.

At 506, reverse relocation is performed on the canister data structure (e.g., relocated canister image 438) using the address relocation data to assemble a binary image (e.g., canister binary image 444) of the canister data structure. In some examples, the reverse relocation process is further based on other metadata (e.g., marker metadata) of the canister and/or data associated with the system upon which the canister has been relocated (e.g., a ksyms symbol table). The relocation data and/or other metadata used to perform the reverse relocation includes data that indicates how data was organized in the canister when it was first generated (e.g., the final configuration of the final canister 118 in system 100 of FIG. 1) and/or data that enables the canister data structure to be reconfigured into its first-generated state (e.g., reversing link-time and/or run-time changes made to the canister data during a relocation process).

At 508, a checksum is generated based on the binary image of the canister (e.g., canister binary image 444). For example, the checksum generation process operates on a concatenation of the original bytes of the loadable sections (e.g., using marker metadata such as metadata 116 of FIG. 1). It should be understood that the checksum generation process used at 508 is substantially the same as the checksum generation process used to generate the checksum that is included in the data of the canister being verified. For instance, the checksum generation process used to generate a checksum from a relocated canister associated with the final canister 118 is substantially identical to the checksum generation process performed by the checksum generator 128 as described with respect to FIG. 1. In some examples, the checksum generation process uses an HMAC algorithm such as a HMAC algorithm using SHA-256.

At 510, the generated checksum is compared to the checksum that is included in the canister data (e.g., the checksum 442 on the relocated canister image 438). If the checksums do not match, the process proceeds to 512. Alternatively, if the checksums do match the canister and its included workload objects is verified and the process proceeds to 514. At 512, when the checksums do not match, the verification of the canister has failed, and a notification of the failed verification is provided. For instance, the failed verification notification may be provided to the system upon which the canister is located to enable the system to refrain from using the workload objects on the canister. Additionally, or alternatively, the failed verification notification may be provided to a user of the system in the form of an error message or warning message. Such a notification may provide instructions to the user indicating steps that may be taken to cure the verification issue (e.g., redownloading or reinstalling the associated software). Further, the user may be provided with an option to halt the execution of the associated software due to the failed verification or to ignore the failed verification and proceed with the execution of the associated software. In some examples, the failed verification may indicate that tampering or other corruption has occurred, and block execution of the associated software.

At 514, the canister and the associated workload objects have been verified and the system proceeds with use of the workload objects. In some examples, the verification process occurs at the beginning of a runtime of the system, which may be during a boot sequence or the like. The system may be configured to complete one or more other boot processes or software initialization processes before and/or after the verification of the canister. Once complete, the system is enabled to make use of the workload objects (e.g., executing applications, programs, scripts, or other software processes for which the workload objects are configured). For instance, in examples where the canister is associated with FIPS encryption standards, after verification of the canister, the system is enabled to make use of the encryption algorithms that are included in the workload objects of the canister.

Figure 6:
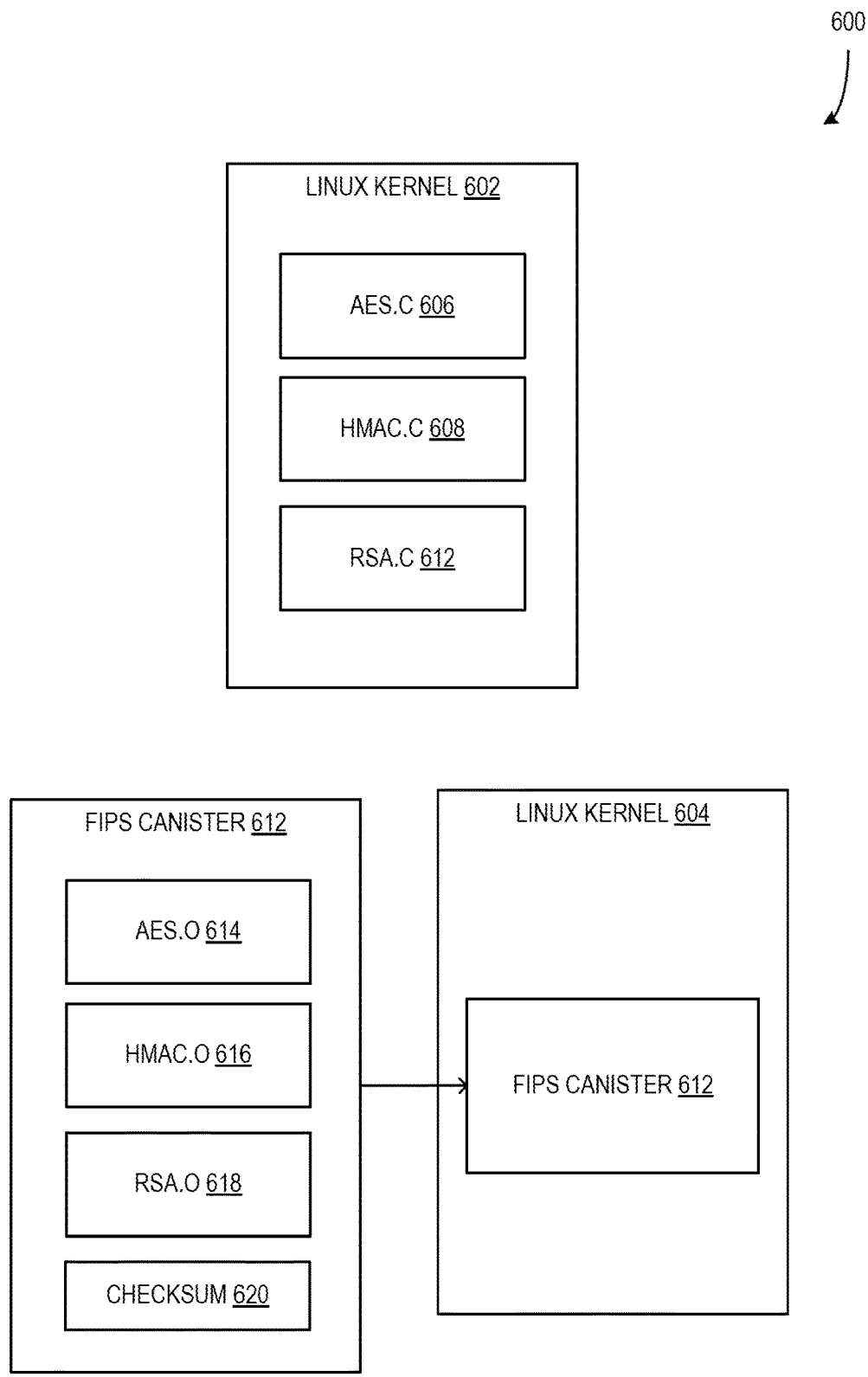
FIG. 6 is a block diagram illustrating a difference between a kernel that does not use a canister and a kernel that does use a canister according to an embodiment.

FIG. 6 is a block diagram 600 illustrating a difference between a kernel 602 that does not use a canister and a kernel 604 that does use a canister 612 according to an embodiment. In some examples, the kernels 602 and 604 are substantially the same as the relocated kernel image 432 of FIG. 4, except for differences described herein with respect to FIG. 6. Both kernels 602 and 604 are LINUX kernels, but it should be understood that canisters as described herein may be used in other sets or groups of software without departing from the description. The LINUX kernel 602 is configured to include an Advanced Encryption Standard (AES) encryption algorithm as defined by source file AES.c 606, an HMAC encryption algorithm as defined by HMAC.c 608, and a Rivest-Shamir-Adleman (RSA) encryption algorithm, as defined by RSA.c 612. The source code included in the .c files of the algorithms is compiled with the LINUX kernel 602 code such that those algorithms are enabled for use in systems upon which the LINUX kernel 602 is installed. However, in some examples, the LINUX kernel 602 needs to be FIPS certified and, for some uses, that certification must be verified prior to use. That verification may be based on checksum generation for the entire LINUX kernel 602 and then later verification of that checksum. However, if any changes are made to the LINUX kernel 602 after the certification and checksum generation (e.g., for bug fixes and/or new features), the new version of the LINUX kernel 602 is no longer considered certified and recertification is necessary. A new checksum must also be generated, as generating a checksum from the changed kernel 602 will yield a different checksum than the one generated from the certified version of the kernel 602. As a result, frequent recertification processes must be performed on the kernel 602 so long as it is under development or otherwise being changed.

Alternatively, LINUX kernel 604 includes a FIPS canister 612 that has been generated as described herein (e.g., a final canister 118 of FIG. 1). The FIPS canister 612 includes object files associated with the same encryption algorithms as included in the kernel 602: an AES.o file 614 for an AES algorithm, an HMAC.o file 616 for an HMAC algorithm, and an RSA.o file 618 for an RSA algorithm. The FIPS canister 612 further includes a checksum 620. In some examples, the FIPS canister 612 has been certified and the checksum 620 has been generated based on the certified version of the canister 612. The FIPS canister further includes the interpreter and checksum measurement metadata as described herein, and the checksum 620 has been generated with those elements included in the canister 612 (e.g., in a logical measurement boundary of the canister, such as logical measurement boundary 120). The FIPS canister 612 is linked to the LINUX kernel 604, enabling the kernel 604 to make use of the algorithms defined within the canister 612. Additionally, because the canister 612 is certified and is configured with the checksum 620 and other built-in verification data, the certification of the FIPS canister 612 can be verified at any time (e.g., by performing the processes described in FIGS. 5 and 6). If the kernel 604, or other kernels that include the FIPS canister 612, do not make changes to the workload object data within the FIPS canister 612, the FIPS certification of the canister 612 is maintained. Other portions of the kernel 604 may be changed to add new features, add new applications or software, and/or fix bugs without requiring that the FIPS canister 612 and/or the kernel 604 as be recertified (e.g., a kernel that includes a certified FIPS canister 612 may be considered certified with respect to FIPS standards).

Exemplary Operating Environment

Figure 7:
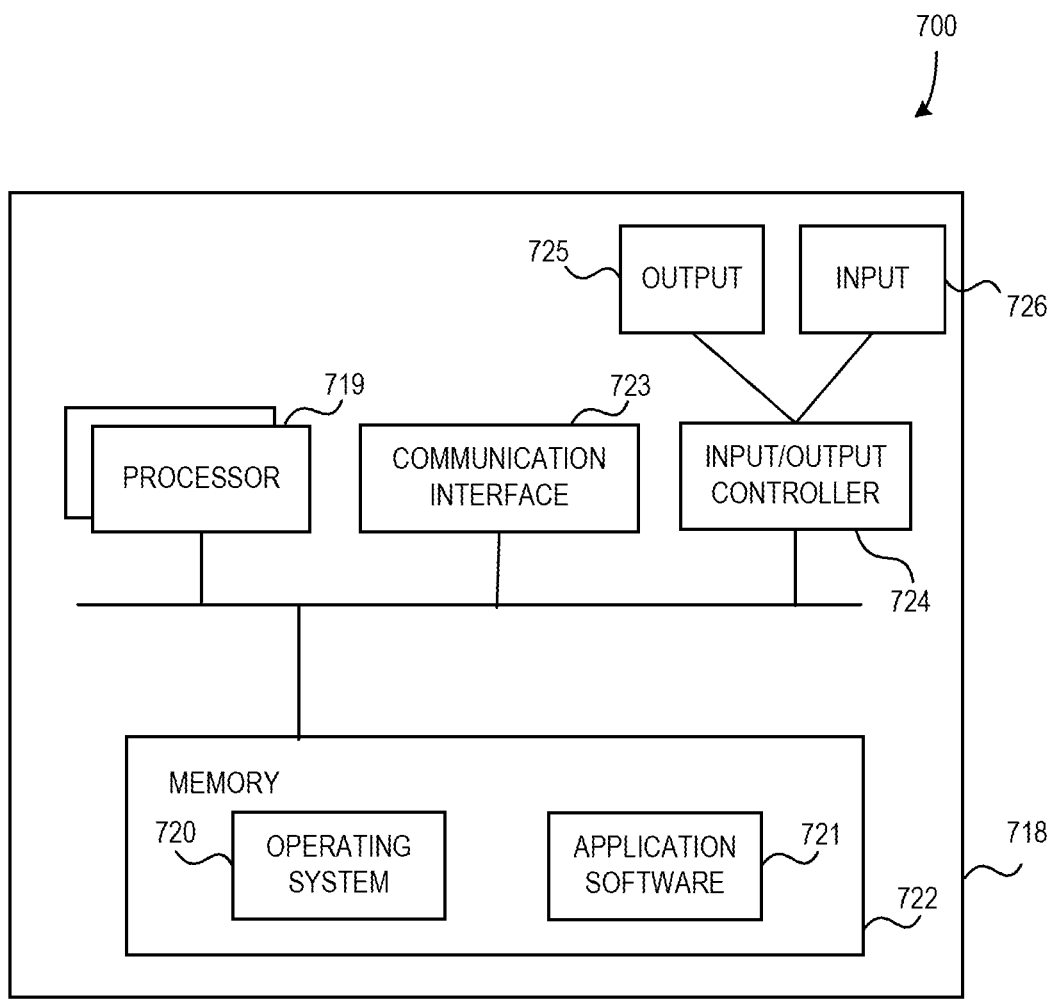
FIG. 7 illustrates a computing apparatus according to an embodiment as a functional block diagram.

The present disclosure is operable with a computing apparatus according to an embodiment as a functional block diagram 700 in FIG. 7. In an embodiment, components of a computing apparatus 718 may be implemented as a part of an electronic device according to one or more embodiments described in this specification. The computing apparatus 718 comprises one or more processors 719 which may be microprocessors, controllers, or any other suitable type of processors for processing computer executable instructions to control the operation of the electronic device. Alternatively, or in addition, the processor 719 is any technology capable of executing logic or instructions, such as a hard-coded machine. Platform software comprising an operating system 720 or any other suitable platform software may be provided on the apparatus 718 to enable application software 721 to be executed on the device. According to an embodiment, generating canister data structures configured with built-in verification capabilities and performing integrity checks on canister data structures using the built-in verification capabilities as described herein may be accomplished by software, hardware, and/or firmware.

Computer executable instructions may be provided using any computer-readable media that are accessible by the computing apparatus 718. Computer-readable media may include, for example, computer storage media such as a memory 722 and communications media. Computer storage media, such as a memory 722, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that the storage may be distributed or located remotely and accessed via a network or other communication link (e.g., using a communication interface 723).

The computing apparatus 718 may comprise an input/output controller 724 configured to output information to one or more output devices 725, for example a display or a speaker, which may be separate from or integral to the electronic device. The input/output controller 724 may also be configured to receive and process an input from one or more input devices 726, for example, a keyboard, a microphone, or a touchpad. In one embodiment, the output device 725 may also act as the input device. An example of such a device may be a touch sensitive display. The input/output controller 724 may also output data to devices other than the output device, e.g., a locally connected printing device. In some embodiments, a user may provide input to the input device(s) 726 and/or receive output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system for integrity verification of a checksum of a canister data structure comprises: a processor; and a non-transitory computer readable medium having stored thereon program code for transferring data to another computer system, the program code causing the processor to: access a kernel image including canister data; allocate a canister data structure in a section of memory; load the canister data structure with canister data from the kernel image, wherein the loading is based on an interpreter object obtained from the kernel image, wherein the canister data includes address relocation data and a checksum of the canister data; assemble a binary image of the canister data structure, wherein the assembling includes at least performing reverse relocation on the canister data structure using the address relocation data; generate a checksum based on the assembled binary image of the canister data structure; and verify the checksum of the canister data using the generated checksum, wherein integrity of the canister data structure is confirmed based on the verifying.

An example method for integrity verification of a checksum of a canister data structure comprises: accessing, by a processor, a kernel image including canister data; allocating, by the processor, a canister data structure in a section of memory; loading, by the processor, the canister data structure with canister data from the kernel image, wherein the loading is based on an interpreter object obtained from the kernel image, wherein the canister data includes address relocation data and a checksum of the canister data; assembling, by the processor, a binary image of the canister data structure, wherein the assembling includes at least performing reverse relocation on the canister data structure using the address relocation data; generating, by the processor, a checksum based on the assembled binary image of the canister data structure; and verifying, by the processor, the checksum of the canister data using the generated checksum, wherein integrity of the canister data structure is confirmed based on the verifying.

A non-transitory computer storage medium has stored thereon program code executable by a first computer system at a first site, the program code embodying a method that comprises: accessing a kernel image including canister data; allocating a canister data structure in a section of memory; loading the canister data structure with canister data from the kernel image, wherein the loading is based on an interpreter object obtained from the kernel image, wherein the canister data includes address relocation data and a checksum of the canister data; assembling a binary image of the canister data structure, wherein the assembling includes at least performing reverse relocation on the canister data structure using the address relocation data; generating a checksum based on the assembled binary image of the canister data structure; and verifying the checksum of the canister data using the generated checksum, wherein integrity of the canister data structure is confirmed based on the verifying.

Alternatively, or in addition to the other examples described herein, examples include any combination of the following:

wherein allocating the canister data structure in the section of memory further includes: identifying the canister data in the kernel image; determining a size of the canister data in the kernel image; and allocating the canister data structure in the section of memory based on the determined size, wherein the allocated canister data structure is at least as large as the determined size of the canister data.

wherein loading the canister data structure with canister data from the kernel image further includes organizing portions of the canister data into consecutive regions in the canister data structure based on marker metadata included in the canister data.

wherein performing the reverse relocation on the canister data further includes reversing changes previously made to the canister data during relocation, wherein the changes include at least one of the following: run-time changes and link-time changes.

wherein generating the checksum based on the binary image of the canister data structure further includes: identifying a logical measurement boundary of the canister data that includes a subset of the canister data in the binary image of the canister data structure and excludes the checksum included in the canister data; and applying a checksum generation algorithm to canister data included in the identified logical measurement boundary, the applied algorithm generating the checksum based on the binary image.

further comprising: based on the generated checksum and the checksum included in the canister data matching, proceeding, by the processor, with use of workload objects defined in the canister data of the canister data structures; and based on the generated checksum and the checksum included in the canister data differing, providing, by the processor, a notification of failed verification associated with the canister data structure.

wherein the canister data includes FIPS certified encryption algorithms, the algorithms including at least one of the following: AES encryption algorithms, HMAC encryption algorithms, and RSA encryption algorithms; wherein the kernel image is a LINUX kernel image; and wherein the verification of the canister data structure is performed during a boot time associated with the LINUX kernel image.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but with the scope of aspects of the claims constitute exemplary means for accessing, by a processor, a kernel image including canister data; exemplary means for allocating, by the processor, a canister data structure in a section of memory; exemplary means for loading, by the processor, the canister data structure with canister data from the kernel image, wherein the loading is based on an interpreter object obtained from the kernel image, wherein the canister data includes address relocation data and a checksum of the canister data; exemplary means for assembling, by the processor, a binary image of the canister data structure, wherein the assembling includes at least performing reverse relocation on the canister data structure using the address relocation data; exemplary means for generating, by the processor, a checksum based on the assembled binary image of the canister data structure; and exemplary means for verifying, by the processor, the checksum of the canister data using the generated checksum, wherein integrity of the canister data structure is confirmed based on the verifying.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method, comprising:
   accessing, by a processor, a kernel image including canister data;
   allocating a canister data structure in a section of memory;
   loading the canister data structure with the canister data from the kernel image, based on an interpreter obtained from the kernel image, wherein the canister data includes address relocation data and a checksum of the canister data;
   assembling a binary image of the canister data structure, wherein the assembling includes at least performing reverse relocation on the canister data structure using the address relocation; data, and performing reverse relocation on the canister data structure comprises reversing changes previously made to the canister data structure during relocation, the changes comprising at least one of:
      run-time changes; or
      link-time changes;
   generating a checksum based on the assembled binary image of the canister data structure; and
   verifying, by the processor, the checksum of the canister data from the kernel image using the generated checksum, wherein integrity of the canister data structure is confirmed based on the verifying.

2. The method of claim 1, wherein the binary image is an executable file.

3. The method of claim 1, wherein loading the canister data structure with canister data from the kernel image further includes organizing portions of the canister data into consecutive regions in the canister data structure based on marker metadata included in the canister data.

4. The method of claim 1, wherein generating the checksum based on the binary image of the canister data structure further includes:
   identifying a logical measurement boundary of the canister data that includes a subset of the canister data in the binary image of the canister data structure and excludes the checksum included in the canister data; and
   applying a checksum generation algorithm to canister data included in the identified logical measurement boundary, the applied algorithm generating the checksum based on the binary image.

5. The method of claim 1, the method further comprising:
   if the generated checksum and the checksum included in the canister data structure match, proceeding, by the processor, with use of workload objects defined in the canister data of the canister data structure; and
   if the generated checksum and the checksum included in the canister data structure differ providing, by the processor, a notification of failed verification associated with the canister data structure.

6. The method of claim 1, wherein allocating the canister data structure in the section of memory further includes:
   identifying the canister data in the kernel image;
   determining a size of the canister data in the kernel image; and
   allocating the canister data structure in the section of memory based on the determined size, wherein the allocated canister data structure is at least as large as the determined size of the canister data.

7. The method of claim 1, wherein:
   the canister data includes one or more Federal Information Processing Standards (FIPS) certified encryption algorithms, the one or more algorithms including at least one of the following:
      one or more Advanced Encryption Standard (AES) encryption algorithms;
      one or more hash-based message authentication code (HMAC) encryption algorithms; or
      one or more Rivest-Shamir-Adleman (RSA) encryption algorithms;
   the kernel image is a LINUX kernel image; and
   the verification of the canister data structure is performed during a boot time associated with the LINUX kernel image.

8. A computer system, comprising:
   a processor; and
   a non-transitory computer readable medium having stored thereon program code executable by the processor to causes the computer system to perform operations comprising:
      accessing, by the processor, a kernel image including canister data;
      allocating a canister data structure in a section of memory;
      loading the canister data structure with the canister data from the kernel image, wherein the loading is based on an interpreter obtained from the kernel image, wherein the canister data includes address relocation data and a checksum of the canister data;
      assembling a binary image of the canister data structure, wherein the assembling includes at least performing reverse relocation on the canister data structure using the address relocation data; data, and performing reverse relocation on the canister data structure comprises reversing changes previously made to the canister data structure during relocation, the changes comprising at least one of:
         run-time changes; or
         link-time changes;
      generating a checksum based on the assembled binary image of the canister data structure; and
      verifying, by the processor, the checksum of the canister data from the kernel image using the generated checksum, wherein integrity of the canister data structure is confirmed based on the verifying.

9. The computer system of claim 8, wherein the binary image is an executable file.

10. The computer system of claim 8, wherein loading the canister data structure with canister data from the kernel image further includes organizing portions of the canister data into consecutive regions in the canister data structure based on marker metadata included in the canister.

11. The computer system of claim 8, wherein generating the checksum based on the binary image of the canister data structure further includes:
   identifying a logical measurement boundary of the canister data that includes a subset of the canister data in the binary image of the canister data structure and excludes the checksum included in the canister data; and
   applying a checksum generation algorithm to canister data included in the identified logical measurement boundary, the applied algorithm generating the checksum based on the binary image.

12. The computer system of claim 8, the operations further comprising:
  if the generated checksum and the checksum included in the canister data structure match, proceeding, by the processor, with use of workload objects defined in the canister data of the canister data structure; and
  if the generated checksum and the checksum included in the canister data structure differ providing, by the processor, a notification of failed verification associated with the canister data structure.

13. The computer system of claim 8, wherein allocating the canister data structure in the section of memory further includes:
  identifying the canister data in the kernel image;
  determining a size of the canister data in the kernel image; and
  allocating the canister data structure in the section of memory based on the determined size, wherein the allocated canister data structure is at least as large as the determined size of the canister data.

14. The computer system of claim 8, wherein:
  the canister data includes one or more Federal Information Processing Standards (FIPS) certified encryption algorithms, the one or more algorithms including at least one of the following:
    one or more Advanced Encryption Standard (AES) encryption algorithms;
    one or more hash-based message authentication code (HMAC) encryption algorithms; or
    one or more Rivest-Shamir-Adleman (RSA) encryption algorithms;
  the kernel image is a LINUX kernel image; and
  the verification of the canister data structure is performed during a boot time associated with the LINUX kernel image.

15. A non-transitory computer storage medium having stored thereon program code executable by a processor to cause a computer system to perform operations comprising:
  accessing, by the processor, a kernel image including canister data;
  allocating a canister data structure in a section of memory;
  loading the canister data structure with the canister data from the kernel image, wherein the loading is based on an interpreter obtained from the kernel image, wherein the canister data includes address relocation data and a checksum of the canister data;
  assembling a binary image of the canister data structure, wherein the assembling includes at least performing reverse relocation on the canister data structure using the address relocation data; data, and performing reverse relocation on the canister data structure comprises reversing changes previously made to the canister data structure during relocation, the changes comprising at least one of:
    run-time changes; or
    link-time changes;
  generating a checksum based on the assembled binary image of the canister data structure; and
  verifying, by the processor, the checksum of the canister data from the kernel image using the generated checksum, wherein integrity of the canister data structure is confirmed based on the verifying.

16. The non-transitory computer storage medium of claim 15, wherein the binary image is an executable file.

17. The non-transitory computer storage medium of claim 15, wherein loading the canister data structure with canister data from the kernel image further includes organizing portions of the canister data into consecutive regions in the canister data structure based on marker metadata included in the canister data.

18. The non-transitory computer storage medium of claim 15, wherein generating the checksum based on the binary image of the canister data structure further includes:
  identifying a logical measurement boundary of the canister data that includes a subset of the canister data in the binary image of the canister data structure and excludes the checksum included in the canister data; and
  applying a checksum generation algorithm to canister data included in the identified logical measurement boundary, the applied algorithm generating the checksum based on the binary image.

19. The non-transitory computer storage medium of claim 15, the operations further comprising:
  if the generated checksum and the checksum included in the canister data structure match, proceeding, by the processor, with use of workload objects defined in the canister data of the canister data structure; and
  if the generated checksum and the checksum included in the canister data structure differ providing, by the processor, a notification of failed verification associated with the canister data structure.

20. The non-transitory computer storage medium of claim 15, wherein allocating the canister data structure in the section of memory further includes:
  identifying the canister data in the kernel image;
  determining a size of the canister data in the kernel image; and
  allocating the canister data structure in the section of memory based on the determined size, wherein the allocated canister data structure is at least as large as the determined size of the canister data.

\* \* \* \* \*